J. Y. CLYMER & M. L. HELLER.
NUT LOCK.
APPLICATION FILED MAR. 12, 1914.

1,142,308.

Patented June 8, 1915.

Witnesses
W. N. Woodson
J. H. Johnston

Inventors
M. L. Heller
J. Y. Clymer

By
Attorneys

THE NORRIS PETERS CO., PHOTO-LITHO., WASHINGTON. D. C.

UNITED STATES PATENT OFFICE.

JESSE Y. CLYMER AND MARKIN L. HELLER, OF RICHLANDTOWN, PENNSYLVANIA.

NUT-LOCK.

1,142,308.

Specification of Letters Patent. Patented June 8, 1915.

Application filed March 12, 1914. Serial No. 824,281.

*To all whom it may concern:*

Be it known that we, JESSE Y. CLYMER and MARKIN L. HELLER, citizens of the United States, residing at Richlandtown, in the county of Bucks and State of Pennsylvania, have invented certain new and useful Improvements in Nut-Locks, of which the following is a specification.

This invention relates to nut locks and has for its primary object to provide a construction wherein the nut may be readily locked in adjusted position upon the bolt and removed therefrom with equal facility.

A further object of the invention is to provide a nut lock wherein the nut carries a pawl adapted to engage a bolt and wherein the pawl may be resiliently held in operative position engaging the bolt or in inoperative position away from the bolt.

The invention has as a further object to provide a device of the above described character which will be simple in construction and wherein the working parts may be readily removed in case of breakage to be replaced by new parts.

With these and other objects in view our invention will be more fully described, illustrated in the accompanying drawings and then specifically pointed out in the claims which are attached to and form a part of this application.

Figure 1:
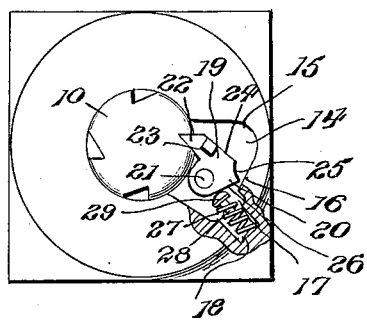
Figure 2:
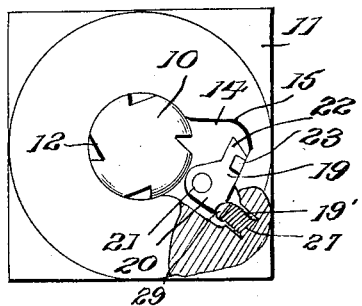
Figure 3:
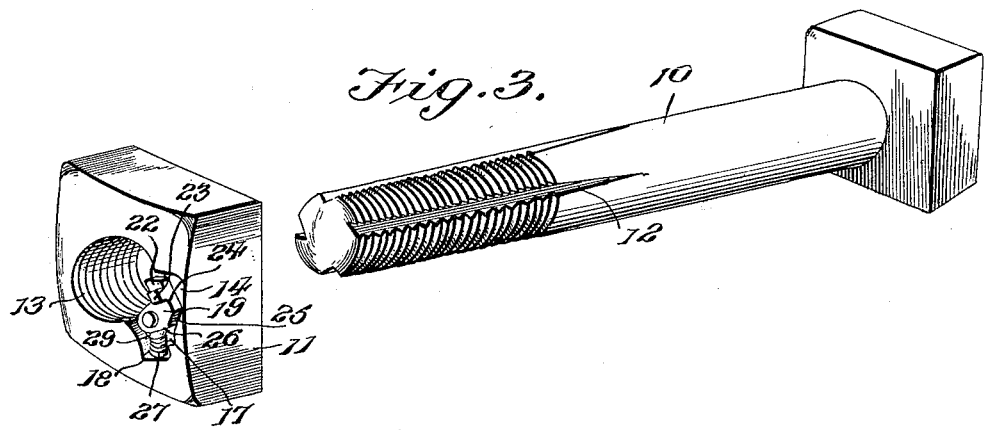
Figure 4:
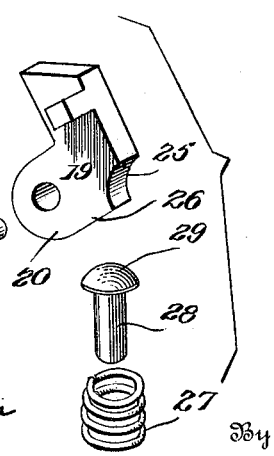

In the drawings, Figure 1 is a top plan view of our improved nut lock showing the pawl in engagement with the bolt, the nut being illustrated as partly broken away, Fig. 2 is a similar view showing the pawl held in position away from the bolt, a portion of the nut being shown in section, Fig. 3 is a perspective view showing the nut detached from the bolt, and Fig. 4 is an enlarged detail perspective view of the pawl and the parts coacting therewith, said parts being shown disassembled but in proper relation.

Corresponding and like parts are referred to in the following description and indicated in all the views of the drawings by the same reference characters.

Referring more particularly to the drawings, the numeral 10 indicates a bolt of usual construction which is threaded adjacent one extremity to receive a nut 11 and is longitudinally grooved upon opposite sides at the threaded end thereof as at 12.

The nut 11 is provided with a threaded bore 13 to receive the bolt 10, and is recessed upon its upper face as at 14, said recess opening into the bore 13 at one side thereof. The recess 14 is preferably provided at one extremity with a curved wall 15 which merges at its inner extremity into a straight wall 16 tangential to the axis of rotation of the nut. At the inner extremity of the wall 16, the recess 14 is laterally enlarged as at 17, the end wall 18 of such enlarged portion of the recess being bored to provide a socket 19'.

Pivotally mounted within the recess 14 is a pawl 19. The pawl 19 is of substantially bell crank shape being provided with a head 20 which is supported upon the pivot pin 21. Formed on the head 20 is the arm 22 which is beveled at its free extremity to engage within the grooves 12 of the bolt, the arm 22 moving in an arcuate path within the recess 14, the curved wall 15 of which is, of course, of such configuration to allow for such movement of the pawl.

Integrally formed on the arm 22 is an upstanding lug 23 which may be engaged by the fingers to operate the pawl, said arm also being formed with a straight outer face 24 adapted to contact with the straight wall 16 of the recess 14, when the pawl is moved to inoperative position within the recess. At the inner extremity of the face 24 the head 20 of the pawl is provided with a concaved face 25, the adjacent outer face 26 of the head being straight and extending at substantially right angles to the face 24.

Arranged within the socket 19', is a helical spring 27 which surrounds the shank of a plunger 28 which is formed at one extremity with an enlarged rounded head 29. The spring 27 is mounted for free longitudinal movement within the socket 19' and extends at one extremity into the enlarged portion 17 of the recess 14, the plunger being supported within the free extremity of the spring and arranged to normally bear by its head 29 against the adjacent walls of the pawl 19.

Particular attention is directed to the disposition of the pawl 19 within the recess 14 and the relative arrangement of the plunger 28. It will be noted that the plunger 28 is arranged to bear against the head 20 slightly on one side of the pivotal axis thereof, the plunger normally tending to hold the free extremity of the pawl projected into the bore 13 of the nut in the path of the bolt. Thus, the nut may be readily applied to the bolt, the pawl automatically preventing retrograde movement thereof through engagement with the grooves 12.

When it is desired to remove the nut, the pawl may be swung by the lug 23 within the recess 14 into inoperative position. This is best shown in Fig. 2 of the drawings. It will be noted that the adjacent straight wall 16 of the recess 14 is so arranged as to form a stop for the pawl in its outward movement within the recess, said wall contacting with the straight face 24 of the pawl and limiting it in its pivotal movement at the point where the convex face of the head 29 of the plunger seats against the concaved face 25 of the pawl. The plunger 28 thus engages the seat 25 of the pawl to maintain the pawl in inoperative position within the recess 14. It will therefore be seen that the pawl 19 will be maintained in inoperative position by the plunger 28 until manually operated to disengage the seat 25 from the head of the plunger when it is desired to swing the pawl to operative position. This is an especial feature of advantage of my invention in that the plunger not only serves to hold the pawl in operative position but in inoperative position as well, the pawl being swung to inoperative position to readily facilitate the removal of the nut 11 from the bolt.

From the foregoing description it will be observed that we provide a very simple and efficient structure for the purpose set forth such as will automatically engage the bolt to prevent retrograde movement of the nut and wherein the means employed for engaging the bolt may be moved to inoperative position to allow the ready removal of the nut from the bolt.

Having thus described our invention, what we claim as new is:

1. A device of the character described including a nut bored to receive a bolt, said nut having a recess formed therein opening into said bore, one wall of said recess forming a stop shoulder, a pawl pivotally mounted upon the nut and arranged in said recess, said pawl being adapted to project into the bore of the nut for engagement with the bolt, and a spring pressed plunger arranged to extend into the recess and disposed to engage the pawl, said plunger being adapted to maintain the pawl in operative position projected into the bore of the nut or in retracted inoperative position in engagement with said stop shoulder.

2. A device of the character described including a nut bored to receive a bolt, said nut having a recess formed therein opening into said bore, a pawl pivotally mounted upon the nut and disposed in said recess, said pawl being adapted to project into the bore of the nut for engagement with the bolt and being formed with a concaved seat and a spring pressed plunger arranged to extend into the recess and disposed to engage the pawl, said plunger being adapted to maintain the pawl in operative position projected into the bore of the nut or in retracted inoperative position in engagement with said seat.

3. A device of the character described including a nut bored to receive a bolt, said nut having a recess formed therein opening into said bore, one wall of said recess forming a stop shoulder, a pawl pivotally mounted upon the nut and disposed in said recess, said pawl being formed with angularly disposed straight faces and having a concaved seat formed therein intermediate the converging extremities of said faces, said nut being provided with a socket opening into said recess, a spring arranged in said socket, and a plunger mounted in the spring, said plunger being formed with a head having a convex face and arranged to contact with the pawl and adapted to maintain the pawl in operative position projected into the bore of the nut for engagement with the bolt by the plunger engaging one of said straight faces formed on the pawl or to maintain the pawl in retracted inoperative position within the recess with the stop shoulder formed on the nut engaging one of the straight faces of the pawl and the convex face of the plunger engaging the concaved seat formed in said pawl.

4. A device of the character described including a nut bored to receive a bolt, a pawl pivotally mounted upon the nut and arranged to engage the bolt, a shoulder carried by the nut and providing a stop for the pawl, said pawl being formed with a seat, and means resiliently engaging said pawl upon one side of the pivotal axis thereof, said pawl being shiftable to a position to engage said stop with the seat thereof in engagement with said means and intersecting the pivotal center therebetween and the pawl.

5. A device of the character described including a nut bored to receive a bolt, a pawl pivotally mounted upon the nut and disposed to engage the bolt, said pawl being formed with a concave seat, a spring pressed plunger carried by the nut and engaging the pawl upon one side of the pivotal axis thereof, said plunger being formed with a head having a convex face, the pawl being movable to disengage the bolt with the convex face of the plunger engaging in said concave seat, the axis of the plunger intersecting the seat, and means carried by the nut for limiting the pawl in its movement in one direction.

6. A device of the character described including a nut bored to receive a bolt, a pawl pivotally mounted upon the nut and disposed to engage the bolt, and means mounted for reciprocating movement tangentially to the pivot of the pawl and resiliently engaging the pawl upon its outer edge.

In testimony whereof we affix our signatures in presence of two witnesses.

JESSE Y. CLYMER. [L. S.]
MARKIN L. HELLER. [L. S.]

Witnesses:
HARVEY F. HESS,
GEORGE A. REINERT.

Copies of this patent may be obtained for five cents each, by addressing the "Commissioner of Patents, Washington, D. C."